Dec. 27, 1960 I. HAAS 2,966,599

ELECTRONIC LOGIC CIRCUIT

Filed Oct. 27, 1958

INVENTOR.
ISY HAAS

BY

Charles C. English

AGENT 2,966,599
Patented Dec. 27, 1960

2,966,599

ELECTRONIC LOGIC CIRCUIT

Isy Haas, Menlo Park, Calif., assignor to Sperry Rand Corporation, New York, N.Y., a corporation of Delaware Filed Oct. 27, 1958, Ser. No. 769,750

10 Claims. (Cl. 307—88.5)

The present invention relates to a circuit for use in electronic computers. More particularly, this invention relates to logic circuitry, such as that of a half-adder, using positive-gap diodes as the switching components.

The function of a half-adder in a computer circuit is described in chapter 4 of "High Speed Computer Devices," by the staff of Engineering Research Associates, Incorporated, and published by McGraw-Hill Book Company (1950).

Half-adders utilizing vacuum tubes, magnetic amplifiers, and other solid state devices as the active components thereof are well known in the field. In this invention, there is disclosed a half-adder in which the active components are positive-gap diodes.

Positive-gap diodes are, at present, known to have fast rise-times, viz. as low as 2 millimicroseconds. By using positive-gap diodes as the switching components in computer circuitry, higher pulse-repetition rates may be employed than has been the case heretofore. The time necessary for computation may, therefore, be reduced by several orders of magnitude as compared to the average computation time at present.

The primary object of this invention is, therefore, to utilize the fast rise-times inherent in positive-gap diodes in computer circuitry.

Another object of the invention is to provide an improved circuit for computers.

A further object of the invention provides a half-adder which will permit operation with high pulse-repetition-rates.

Yet another object of the invention is to provide components for computer design which will reduce computation time by several orders of magnitude.

A still further object of the invention is to provide a new and improved half-adder utilizing semi-conductors.

Still another object of the invention is to provide a half-adder requiring low stand-by power.

The present invention utilizes positive-gap diodes such as are described in "Electrical Communication," June 1955, pages 113 to 117. These positive-gap diodes exhibit a mode of operation with two distinct operating states, and a negative resistance characteristic. The two operating states correspond to a "low" and a "high" conductivity state, respectively.

In accordance with this invention, if an input signal is applied to a positive-gap diode as used in this invention, the diode is triggered to the "high" conducting state, and provides, thereby, an output signal across a load element associated with the circuit. More particularly, if input signals are applied to two diodes connected in opposition, a signal will be received at a "carry" output terminal. However, if an input signal is received by only one of the opposing diodes a signal will be received at a "sum" output terminal.

Figure 1:
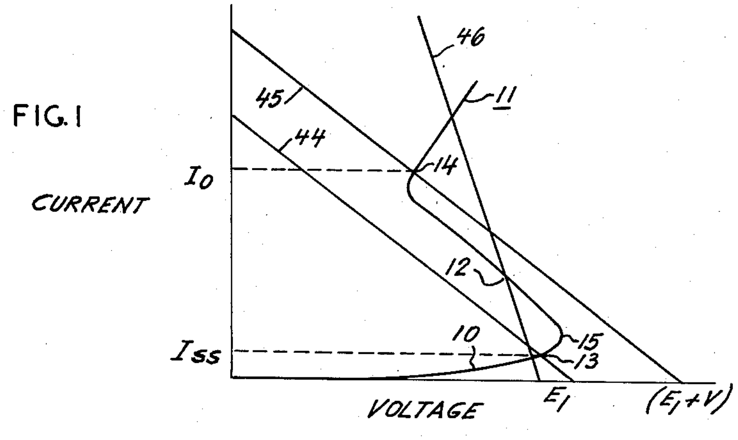
Figure 1 is a typical graph of the voltage-current characteristic of a positive-gap diode.

In Figure 1, a stable, quiescent or "low-conductivity" state of a positive-gap diode is indicated graphically generally at 10. A stable, energized or "high-conductivity" state is indicated generally at 11. The region indicated generally at 12 is the region of negative resistance, which introduces a discontinuous or unstable condition into the operation of the positive-gap diode, if the equivalent load is larger than $$\frac{dV}{dI}$$

It may be seen that, in addition to rapid switching, the positive-gap diode acts as an amplifier. The amplification of the diode may be determined by using the formula:

$$G=\frac{(I_o-I_{ss})R_L}{V}$$

where $R_L$ is the load resistance, $I_o$ and $I_{ss}$ are the currents obtained at the high and low conductivity states, respectively, and V is the positive input signal.

Figure 2:
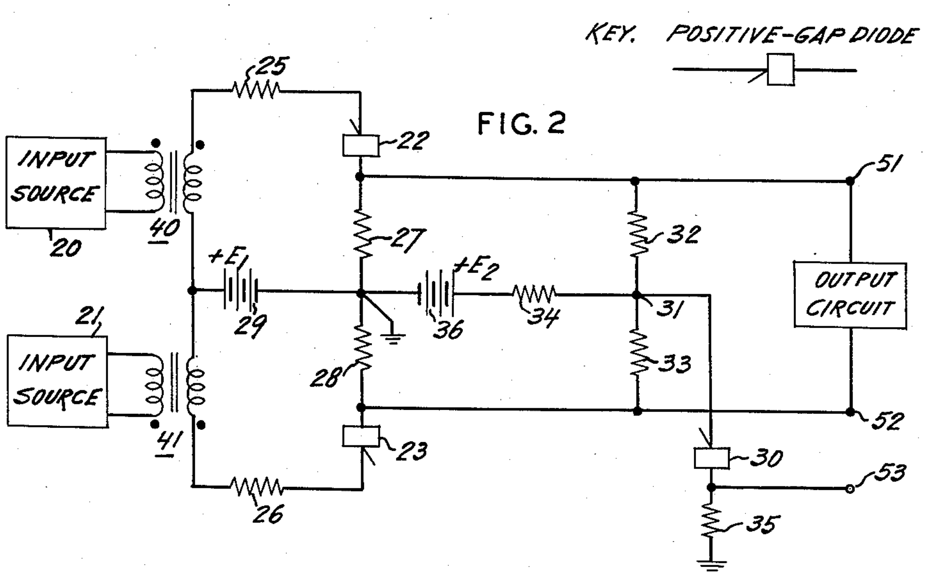
Figure 2 is a schematic circuit diagram of an embodiment of the invention.

Referring now to Figure 2, positive-gap diodes 22, 23, and 30 having characteristics of the type shown in Figure 1 are provided. The anode of diode 22 is connected to one terminal of the secondary winding of transformer 40 via balancing resistor 25. The anode of diode 23 is similarly connected to one terminal of the secondary winding of transformer 41 via balancing resistor 26. The other terminals of the secondary windings on transformers 40 and 41, respectively, are connected to each other and to the positive pole of battery 29 which is at a potential of $E_1$ above ground. The cathode of diode 22 is connected to the "sum" output terminal 51 and to one end of load resistor 27. Similarly, the cathode of diode 23 is connected to the "sum" output terminal 52 and to one end of load resistor 28. The other ends of the load resistors 27 and 28 are connected to each other and to ground. The primary windings of transformers 40 and 41, are connected to input signal sources 20 and 21, respectively, which may be, for instance, other computer circuit outputs. The sources 20 and 21 supply binary signals in the form of either pulses or the absence of pulses to the primaries of transformers 40 and 41. The senses of linkage of the primaries and secondaries are indicated by the usual "dot" convention. As is shown in Figure 2, a resistor logic network comprises resistors 32, 33 and 34, each of which has one end thereof connected to the anode of diode 30 at the junction 31. The other ends of resistors 32 and 33 are connected to the "sum" output terminals 51 and 52, respectively. The other end of resistor 34 is connected to the positive terminal of battery 36 which is at a potential of $E_2$ above ground. The cathode of diode 30 is connected to the "carry" output terminal 53 and, also, to ground via load resistor 35.

The operation of the circuit is described with reference to Figure 1, where the load-line 44 for the circuit of the diode 22 may be seen; the load-line for the circuit of the diode 23 is substantially the same. The load-line 44 is determined substantially by the voltage $E_1$ of the source 29 and resistors 25 and 27 (or 26 and 28). The zero-current voltage for the load-line 44 of the diode 22 is slightly less than $E_1$ due to the voltage drop across resistor 27 produced by the source 36. If the load-line 44 (as shown) intersects the V, I characteristic curve at only one point, as for example 13, the positive-gap diode will exhibit a monostable type of operation. That is, the point 13 represents the stable quiescent operating point of the diode 22. Upon the application of a pulse from the source 20, a positive-going voltage V is induced in the secondary of transformer 40 which is added to $E_1$ and applied to the anode of positive-gap diode 22. The operating point of the diode 22 will shift to the right along the characteristic curve. The positive voltage V being sufficiently large, the diode operating point passes the "knee" 15 of the characteristic curve and shifts through the unstable region 12 to the region 11 of high current and low diode resistance. The diode operating point assumes the stable state 14 which is determined by the intersection of the new load-line 45 and the diode characteristic curve. The load-line 45 has the same slope as load-line 44, the circuit load remaining unchanged but having a larger applied voltage of $E_1$ plus V. When the positive voltage V terminates, the operating point will again shift to a stable state illustrated graphically in Figure 1 at point 13. Thus, it may be seen that the positive-gap diode will revert to its original low-current-conducting state when the positive input voltage signal is removed from the anode of the diode. When the diode 22 is in the quiescent, low-current state, in the circuit shown, its cathode is close to ground potential; and when changed to the high-current state, its cathode goes considerably positive. The operation of diode 23 is similar.

In the operation of the circuit, diodes 22 and 23 control the "sum" output. These diodes are assumed to be ideal and to normally reside in the quiescent or low-conductivity state, for example, at point 13 in Figure 1. The "sum" output voltage generated between terminals 51 and 52 corresponds to the difference between the potential across load resistors 27 and 28, respectively. A preferable embodiment uses matched diodes at 22 and 23 and, also, utilizes matched loads at 27 and 28 because the inputs supplied by sources 20 and 21 are, generally, identical pulses from preceding computer circuitry. Therefore, if, for example, an input signal is supplied by source 20 to diode 22, in the absence of an input signal being applied to diode 23 by source 21, diode 22 will shift to its high-conductivity state whereas diode 23 will remain in its low-conductivity state. Consequently, the potential drop across resistor 27 will be much larger than the potential drop across resistor 28. Thus, the potential at terminal 51 will rise as a function of the potential drop across 27, and the potential at terminal 52 will remain constant at substantially ground potential since the current flow through 28 will not change. This difference in the potential drops across the load resistors 27 and 28 is used as a "sum" output signal. In the event of an input being supplied by source 21 and not by source 20, a similar operation will occur with the exception that diode 23 instead of diode 22 will conduct heavily. This will cause the potential of terminal 52 to rise while that of terminal 51 will remain constant. A signal, in the form of a pulse, will thus be produced at the "sum" output between terminals 51 and 52 in the case of an input to either diode 22 or 23.

If it should happen that inputs are supplied simultaneously by sources 20 and 21, the change in diode operation as described above will occur simultaneously in both diodes 22 and 23. That is, the operating points of diode 22 and diode 23 will both shift from 13 to 14 and both diodes will, therefore, conduct heavily. This phenomenon will, of course, cause an increased potential drop across both of the load resistances 27 and 28, thus raising the potential at both the "sum" output terminals 51 and 52. The simultaneous rise in potential of terminal 51 and terminal 52, will obviously result in no potential difference between those terminals and, thus, no "sum" output signal will be obtained. However, if terminal 51 and terminal 52 each rise at the same time, the potential of junction 31 will rise as a consequence.

The potential rise at junction 31, the anode of diode 30, is ultimately dependent upon the input signals supplied by sources 20 and/or 21. That is, when these inputs are applied the potential at terminals 51 or 52, or both, will rise. This potential rise will be translated to junction 31 via resistors 32 and/or 33. Accordingly, if an input is supplied by source 20 or 21, the voltage at terminals 51 or 52 will add to the reference potential $E_2$ already applied to junction 31 by battery 36. When only one input is supplied, the rise in potential at 31 is not sufficient to trigger diode 30. However, when inputs are supplied by both 20 and 21 the sum of the potentials at 31 (viz. substantially $+E_2$ and the voltages at terminals 51 and 52) will be large enough to shift diode 30 from its quiescent operating point (along the low-current region 10 in Figure 1) to its high-current operating point (along the region 11 in Figure 1). This will trigger diode 30 so that it will conduct heavily. The increase in current through load resistor 35 will create an increased voltage drop across resistor 35 and, that is, cause an increase in potential and consequently an output at "carry" terminal 53.

It may easily be seen by those skilled in the art that a bistable type of operation may be obtained by merely altering the load-line slope so that quiescently it intersects the characteristic curve in three places, as shown, for example by the load-line 46. With such a load-line 46, and when a positive voltage V is applied, the diode will switch to its high-conducting state 11 as before. However, when the voltage V terminates, the diode remains stably in region 11 at the point where the load-line intersects the characteristic curve. Accordingly, with this type of bistable operation, the diodes will be switched to their high-conducting state 11 by an input signal, as described, but the diodes will not spontaneously revert to their low-conducting state when the input signal is removed. A form of the invention which utilizes the bistable positive-gap diode operation may be desirable for some purpose. To reset the diodes under such circumstances, a source of clock pulses (not shown) of sufficient magnitude and effective in the direction opposite to that of the input signal may be provided. Such clock pulses would then serve to reset the diodes to their original quiescent or low-conductivity during the interval between binary sources 20 and 21.

Figure 3:
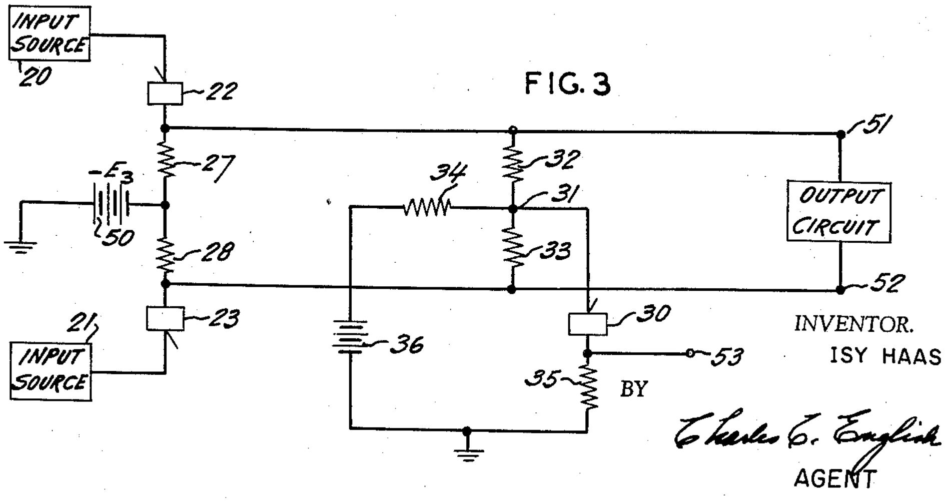
Figure 3 is a schematic circuit diagram of another embodiment of the invention.

A modification of the invention is shown in Figure 3 where parts corresponding to those previously described are referenced by the same numerals. The input signals from input sources 20 and 21 are supplied directly to the anodes of positive-gap diodes 22 and 23. The cathodes of the diodes are connected, as before, to load resistors 27 and 28. However, the common connection between the load resistors is connected to the negative terminal of battery 50 at a potential of $-E_3$. The operation of this circuit is similar to that of the circuit of Figure 2. It will be noted that resistors 25 and 26 (see Figure 2) have been omitted in Figure 3. These resistors may be omitted when certain conditions of balance are either not critical or may be adequately arranged by the diodes and load resistances in the respective networks, so that the output voltages generated across the load resistors 27 and 28 are substantially equal.

If A and B represent the two inputs; S represents the "sum" output; and C represents the "carry" output, then the logic of the circuit may be represented as follows:

$S=(A+B)\overline{AB}$; $A$ or $B$, and not both $A$ and $B$ $C=AB$; both $A$ and $B$.

The operation of the circuit may also be shown by reference to the following function table:

| A | B | S | C |
|---|---|---|---|
| 0 | 0 | 0 | 0 |
| 0 | 1 | 1 | 0 |
| 1 | 0 | 1 | 0 |
| 1 | 1 | 0 | 1 |

As a matter of design, the values of resistors 32 and 33 should be chosen large enough so that there is no significant loading due to the parallel connection with resistors 27 and 28, respectively. Also, for simplicity, the corresponding resistances should be matched. That is resistors 27 and 28 should be equal and resistors 32 and 33 should be equal. Resistor 34, between the anode of the diode 30 and reference voltage $+E_2$, and resistor 35, between the cathode of diode 30 and ground, must be carefully chosen so that the operating point of diode 30 is quiescently in the region 10, for example at 13, on the V, I characteristic curve, as shown in Figure 1, in order to prevent the triggering of the diode by the application of only one input signal.

In the description of the operation of the circuit, the monostable type of operation of the diodes has been assumed. In the alternative, a bistable type of operation of the positive-gap diode may be utilized.

Two half-adders of the type described may be cascaded in the usual manner to form a full adder. That is, the "sum" output from one half-adder may be coupled to one of the inputs of a second half-adder. A suitable rectifier circuit may be used as the coupling circuit. The other input to the second half-adder would be the "carry" signal from a previous stage. The "carry" outputs from both of the half-adders would be fed into an OR-gate from which the "carry" output of the full-adder would be obtained. The "sum" output from the second half-adder would constitute the output of the full adder.

While I have thus described a preferred apparatus and its method of operation in accordance with the present invention, variations may be suggested to those skilled in the art. It must, therefore, be emphasized that the foregoing description is meant to be illustrative only and should not be considered limitative of my invention. All variations and modifications, as are in accord with the principles herein described, are meant to fall within the scope of the appended claims.

Having thus described the invention, what is claimed is:

1. A logic circuit comprising a plurality of positive-gap diodes each having high and low current states, means for biasing said diodes to normally reside in one of said states, separate means for supplying input signals to each of said diodes, each of said input signals being of sufficient amplitude to switch only one of said diodes from said one to the other of said states, and output means connected to said diodes to produce different output signals in accordance with certain combinations of the states of said diodes, said output means including a first output circuit for producing output signals in response to either one but not all of said diodes being switched to said other state, and a second output circuit for producing output signals in response to all of said diodes being switched to said other state.

2. A logic circuit comprising a plurality of positive-gap diodes each having high and low current states, means for biasing said diodes to normally reside in one of said states, separate means for individually supplying input signals to first and second ones of said diodes, the biasing of said first and second diodes being such and each of said input signals being of sufficient amplitude to switch one of said first and second diodes from said one to the other of said states, and output means connected to said first and second diodes to produce different output signals in accordance with certain combinations of the states of said first and second diodes, said output means including a first output circuit for producing output signals in response to either one but not both of said first and second diodes being switched to said other state, and a second output circuit for producing output signals in response to both of said first and second diodes being switched to said other state, said second output circuit including a third one of said plurality of diodes, and means connecting said third diode to said first and second diodes for supplying signals to said third diode in response to said first and second diodes being switched to said other state to overcome the bias of said third diode.

3. In combination, a plurality of positive-gap diode amplifier means each of which has one stable operating state, first and second means for respectively supplying inputs to first and second ones of said amplifier means, first and second load means respectively connected to said first and second amplifier means, said first and second load means being connected to a common point, a first output circuit connected across said first and second load means, a plurality of resistors connected in parallel with said first and second load means, a third one of said plurality of amplifier means being connected at a junction of said resistors, third load means connected to said further amplifier means, and a second output circuit connected across said third load means.

4. In a half-adder, the combination of first and second input means, said first and second input means each having one terminal connected to a reference voltage, first and second positive-gap diode means, said first and second diode means each having a first and a second electrode, each of said first electrodes being connected to a further terminal of a different one of said first and second input means, first and second load means each having one end thereof connected to a different one of said second electrodes, each of said first and second load means having another end connected to a reference voltage, output terminals connected to said second electrodes, means connected between said output terminals for deriving an output signal in accordance with the difference in signal amplitude at said output terminals whereby an output signal is obtained when an input signal is applied to only one of said first and second input means, a three terminal voltage divider network connected at end terminals to said output terminals, a resistor connecting a reference voltage to an intermediate terminal of said voltage divider, third positive-gap diode means, a first electrode of said third diode means being connected to said voltage divider at said intermediate terminal, third load means connected to a second electrode of said third diode means, and a further output teminal connected to said second electrode of said third diode means.

5. In a half-adder, the combination of first and second positive-gap diodes, said diodes having quiescent and energized states, separate means for selectively supplying input signals of a certain amplitude to a first electrode of each of said first and second diodes respectively, first and second load means each having one terminal thereof connected to a second electrode of each of said first and second diodes respectively, said first and second load means each having another terminal connected to reference voltage means, said load means, said diodes, and said input signal supplying means being such that substantially equal amplitude signals are produced at said second electrodes in response to input signals from said supplying means, first output means connected to each of said second electrodes of said diodes, said first output means being responsive to a certain combination of said signals produced at said second electrodes to produce an output signal, a plurality of series resistors being connected parallel to said first and second load means, a third positive-gap diode having stable quiescent and energized states, reference voltage means connected to a common connection of each of said series resistors and to a first electrode of said third diode, third load means connected to a second electrode of said third diode, and second output means connected to said second electrode of said third diode, said third diode means being responsive to a different combination of said signals produced at said second electrodes of said first and second diodes and said reference voltage means to obtain a further output signal.

6. In combination, a plurality of positive-gap diode amplifier means each of which has a high current state and a low current state, means for biasing said amplifier means to normally reside in said low current state, means for supplying input signals to said amplifier means, said input signals being of sufficient amplitude to switch certain ones of said amplifier means from said low to said high current state, first and second load means connected to said certain ones of said amplifier means, said first and second load means being further connected to a common reference voltage point, a first output circuit connected across said first and second load means, a plurality of series connected resistors in parallel with said first and second load means, a further one of said plurality of amplifier means having said high and low current states being connected at a junction of said series connected resistors, said means for biasing said amplifier means including means for biasing said further amplifier means to reside normally in said low current state and to permit said further amplifier means to switch to said high current state in response to said certain ones of said amplifier means being switched to said high current state, third load means connected to said further amplifier means, and a second output circuit connected across said third load means.

7. A half-adder comprising a plurality of positive-gap diode amplifier means each having high and low current states, separate load means connected in a different circuit with each of said diode means, means for biasing each of said circuits so that said diode means normally reside in one of said states, means for applying signals to each of said circuits, said signals, biasing means, and load means being such that each of said diode means is switched to the other of said states in response to an associated signal and is restored to said one state only upon termination of said associated signal, said means for applying signals to said circuits including separate means for supplying input signals to first and second ones of said diode means, a first output circuit connected to said first and second diode means for producing output signals in response to either one but not both of said first and second diode means being switched to said other state, said means for applying signals to said circuits further including means for supplying signals to a third one of said diode means to switch it to said other state in response to both of said first and second diode means being switched to said other state, and a second output circuit connected to said third diode means for producing output signals in response to both of said first and second diodes being simultaneously switched.

8. In a half-adder, the combination of first and second positive-gap diode means, said diode means having quiescent and energized states, separate input means inductively coupled to first electrodes of each of said first and second diodes for selectively supplying input signals of a certain amplitude of each of said first electrodes respectively, said amplitude of said input signals being sufficient to switch said diode means from said quiescent to said energized states, first and second load means each having one terminal thereof connected to second electrodes of each of said first and second diode means respectively, said first and second load means each having another terminal connected to reference voltage means, said load means and said reference voltage means defining a load line which in association with a characteristic curve of said first and second diode means defines an operating point whereby substantially equal amplitude signals are produced at said second electrodes of said first and second diodes in response to said input signals from said input supplying means, first output means connected to said second electrodes of said diodes, said first output means being responsive to a certain combination of said substantially equal amplitude signals when not produced simultaneously at said second electrodes to obtain an output signal, a plurality of series resistors being connected parallel to said first and second load means, a third positive-gap diode having quiescent and energized states, reference voltage means connected to said common connection of said series resistors and a first electrode of said third diode, third load means connected to a second electrode of said third diode, and second output means connected to said second electrode of said third diode, said third diode means being responsive to a combination of said substantially equal amplitude signals when produced simultaneously at said second electrodes of said first and second diodes to switch said third diode to said energized state whereby a further output signal is produced.

9. In a half-adder network including first and second binary signal input means and sum and carry output terminals, the combination of; first and second positive gap diode amplifier circuits respectively interconnecting the first and second input signal means to the sum terminals of the network, circuit means connected to the output portions of said first and second positive gap diode amplifiers and operable to produce a signal in response to simultaneity of output signals from said first and second positive gap diode amplifiers, and a third positive gap diode amplifier interconnecting the output portion of said circuit means to the carry output terminal of the network.

10. In a half-adder network including first and second binary signal input means and sum and carry output terminals, the combination of; first and second positive gap diode amplifier means respectively connected between said first and second input signal means and the sum terminal of said network, first circuit means connected to the output elements of said first and second positive gap diode amplifier means and operable to produce a signal at said sum terminal in response to an output signal from either one but not both of said first and second positive gap diode amplifier means, second circuit means connected to the output elements of said first and second positive gap diode means and operable to produce a signal only in response to simultaneity of output signals from both of said first and second positive gap diode amplifier means, and third positive gap diode amplifier means interconnecting the output portion of said second circuit means to said carry output terminal of said network.

References Cited in the file of this patent

UNITED STATES PATENTS

| | | |
|---|---|---|
| 2,693,907 | Tootill | Nov. 9, 1954 |
| 2,694,521 | Newman et al. | Nov. 16, 1954 |

FOREIGN PATENTS

| | | |
|---|---|---|
| 166,800 | Australia | Feb. 6, 1956 |

OTHER REFERENCES

A Full Binary Adder Employing Two Negative Resistance Diode, by Horton et al., IBM Journal, July 1958, pp. 223–231.